United States Patent [19]

Fetzer et al.

[11] 4,133,901

[45] Jan. 9, 1979

[54] PROTEIN FILM PROCESS

[75] Inventors: Richard W. Fetzer, Carpentersville; Kolar S. Ramachandran, Palatine, both of Ill.

[73] Assignee: The Quaker Oats Company, Chicago, Ill.

[21] Appl. No.: 826,406

[22] Filed: Aug. 22, 1977

Related U.S. Application Data

[63] Continuation of Ser. No. 672,417, Mar. 31, 1976, abandoned, which is a continuation-in-part of Ser. No. 556,644, Mar. 10, 1975, abandoned.

[51] Int. Cl.$^2$ ............................................... A23J 3/00
[52] U.S. Cl. ..................................... 426/573; 426/574; 426/104; 426/302; 426/656; 426/657; 426/438; 426/456; 426/802

[58] Field of Search .................. 426/74, 99, 104, 302, 426/573, 574, 580, 656, 657, 601, 641, 441, 456, 802, 672, 417, 93, 94, 438

[56] References Cited

U.S. PATENT DOCUMENTS

| 2,874,049 | 2/1959 | Pader et al. ..................... 426/802 X |
|---|---|---|
| 2,879,163 | 3/1959 | Anson et al. ..................... 426/517 X |
| 3,840,679 | 10/1974 | Liepa et al. ........................... 426/104 |
| 3,950,550 | 4/1976 | Katayama et al. .............. 426/656 X |
| 3,969,539 | 7/1976 | Sumner et al. .................. 426/104 X |
| 3,973,044 | 8/1976 | Giddey et al. ......................... 426/104 |

*Primary Examiner*—Robert A. Yoncoskie
*Assistant Examiner*—E. M. Kepplinger
*Attorney, Agent, or Firm*—Mathew R. P. Perrone, Jr.; Charles J. Hunter

[57] ABSTRACT

A protein slurry is shaped into a film. The protein film is then shaped into a variety of products. This process permits the use of otherwise unsuitable protein in forming desirable products.

25 Claims, No Drawings

PROTEIN FILM PROCESS

CROSS REFERENCE TO RELATED APPLICATIONS

This application is a continuation of United States Patent Application Ser. No. 672,417 filed Mar. 31, 1976 (now abandoned); which application is in turn a continuation-in-part of United States Patent Application Ser. No. 556,644 filed Mar. 10, 1975 (now abandoned).

BACKGROUND OF THE INVENTION

This invention relates to foods, and more particularly to food formed by modification of proteins.

Protein deficiency is common throughout many parts of the world, with protein malnutrition being the most wide spread and serious nutritional problem in the underdeveloped areas of the world. Health problems resulting from protein deficiency have not yet been solved because the remedies available are not multi-purpose and inexpensive. A solution suitable for one country may not be acceptable for another because of economic resources, climate, social patterns, eating habits and ethnic limitations. Worldwide research to develop protein rich foods of low cost has been the most important attempt to prevent protein malnutrition.

Present economic conditions, which result in high cost for food, lead to research in how to make essential nutrients more available to the general public at a lower cost. Meat is one of the most popular contributors of high quality protein, and other nutrients to the American diet. However, rising beef prices bring out the realization that it is now necessary to seek new and less expensive protein sources. There are many sources of protein available. Besides meat, other animal proteins are poultry, fish, eggs, milk and milk products. Soybeans, peanuts, cereals and other plant or vegetable proteins are the other major protein sources. However, many of these plant proteins lack the required palatability to make them suitable for use. Various methods of modification of these protein sources are being used to make them more palatable and therefore more acceptable. However, the present processes of modifying the alternative protein sources have not provided the desired cost effectiveness reduction or palatability to render the material suitable as a substitute.

One such substitute protein is basically known as texturized protein. There are three basic processes for forming this texturized protein. There is a spinning process, an extrusion process, and a glass-puffing extrusion process. The spinning process involves extruding a protein dope or solution through a die into a coagulation bath to form fibers. The problem becomes obvious during the extrusion of the dope and the determination of a proper coagulation bath. In the extrusion process, high pressures and temperatures are used to form a plexilaminate. In this product the cells of the product are longer in the direction of the extrusion. The glass-puffing process is also a high pressure and high temperature process. The use of high pressure and high temperature requires sophisticated, expensive equipment, capital, and skills to handle. The high temperature and pressure also damages the protein thus processed. Furthermore, the protein thus being processed still retains some of its undesirable flavor and taste characteristics. For example, the taste of the protein has not been improved. The type of protein being processed may well not have the desired palatability. Thus, while there exist processes for forming suitable protein substitutes, many problems still remain to be solved in the formation of protein substitutes.

In the prior art spun protein processes, there is an effluent disposal problem. This effluent results from the basic nature of prior art wet processes. In order to treat the raw protein, the raw material is dissolved in an alkali medium. For example, soy protein isolate can be dissolved in sodium hydroxide solution to form a protein dope. This solution of protein is then extruded into an acid coagulation bath. This acid bath coagulates the protein, and the protein fibers are formed. The fibers thus formed are tender and must be hardened in a salt solution bath to make them suitable for use. Thus, there are three basic steps in the prior art for forming spun protein fibers. In each of the three basic steps a liquid residue is left after the process is complete. It becomes a problem to dispose of these residues.

In an effort to improve the texture of protein and avoid the effluent problem, sheeting technology provides an appropriate answer. Presently with this sheeting technology it is necessary to use high pressure. Such high pressure is difficult to handle and complicates the process of sheeting the protein. Furthermore, the high pressure does not always produce a desirable protein. Substantial modification to the protein sheet formed under high pressure is usually required to make a suitable product. Creping is one modification. Even that creping requires substantial further treatment to achieve a textured meat-like product. That treatment is substantial and adds to the cost of the product without achieving all of the desired features of textured product.

Thus, the modification of protein to render it suitable for use in a variety of ways has caused a substantial number of problems in the prior art. These problems remain to be solved.

SUMMARY OF THE INVENTION

Therefore, it is an object of this invention to provide an improved protein product.

Also, an object of this invention is to provide an improved protein product at low cost.

A further object of this invention is to provide an improved protein product to relieve the protein deficiency problem.

It is a still further object of this invention to provide an improved protein product while avoiding the problems of effluents.

Another object of this invention is to provide an improved protein product without very high temperature processing.

Yet another object of this invention is to provide an improved protein product without high pressure processing.

Still another object of this invention is to provide a protein having a bland taste.

Also an object of this invention is to provide a process for making an improved protein product at low cost.

It is a further object of this invention to provide a process for making a protein product having improved palatability.

It is a further object of this invention to provide a process for making an alternative protein source.

Another object of this invention is to provide a process for making a protein product which requires no high pressure treatment.

Yet another object of this invention is to provide a process for making a protein product which does not require very high temperature processing.

Still another object of this invention is to provide a protein product having the desired palatability.

These and other objects of the invention are accomplished by providing a process which forms a water slurry of a protein-containing component and treats the protein slurry thus formed on a film forming mechanism to form a protein film which is shaped into desired products.

DESCRIPTION OF THE PREFERRED EMBODIMENTS

A protein product is formed by making a slurry of the protein in water and treating the water slurry on a drum which is both rotating and conventionally heated. Within this slurry, fats, starches, vitamins, minerals, and other additives may be included to provide desired nutrients and flavors.

Many possible protein sources exist which are suitable for use. These protein sources include soy protein, cottonseed protein, sesame protein, peanut protein, cereal protein, meat by-products, and sodium caseinate. Within the cereal protein family, especially suitable for use in this invention is wheat gluten, oat protein, and corn protein. The protein sources which produces the most desirable products as to palatability and ease of manufacture is the soy protein. Of course, there are many soy protein sources — including soy flour, soy protein concentrate, and soy protein isolate in order of increasing protein content. Additionally, one or more protein sources are suitable for use in this product and process. In fact, any reasonable mixture of the proteins listed above can be used to form the product of this invention.

The soy protein is the preferred protein for this invention because it is abundantly available in this country. Soy protein ingredients are the most commonly available in the market at a relatively inexpensive cost. Of all the commercially available plant protein ingredients, soy protein has very acceptable nutritive properties. Soy protein is also abundantly manufactured for use in human food products, whereas the other oil seed proteins and cereal proteins are not as readily available.

Specifically suitable mixtures of protein include soy protein of any suitable type and oat protein of any suitable type, soy protein and milk proteins, soy proteins in combination with egg proteins, soy protein in combination with cereal germ proteins such as wheat germ or corn germ.

These mixtures of protein are especially suitable because neither soy protein nor other vegetable proteins are nutritionally complete proteins. However, in certain combinations with each other, the proteins of soy and oat approach that of casein in nutritive properties. The type of protein is easily determined for a particular type of protein-containing material. Once the type of protein is known, it is possible to mix various protein sources in different combinations in order to obtain nutritionally complete protein. By "complete" is meant the protein provides all of the physiological functions customarily associated with the protein.

Within the product or products of this invention, the protein concentration can vary widely. On a dry basis the protein concentration in the product of this invention ranges from about 30% to about 95% by weight of the dry mixture. If the desired product is to be a meat-like product, a suitable range of protein content is about 40% to about 95% by weight. Especially suitable for a meat product is a protein concentration on a dry basis of about 50%. If the product of this invention is to be a pastry, the protein concentration ranges from about 30% to about 60% by weight of the components on a dry basis. As with the meat, the pastry protein concentrate is about 50% on a most suitable basis. If the desired product is a chip-like, snack product, the desired protein content is about 30% to 60%. As with the pastry product, a suitable protein concentration for the chip-like snack product is about 50%. Thus, it can be seen that the protein product of this invention can be used in a number of ways. This wide variety of uses for the protein — in meat, pastry, or chip form — illustrates the success of the film formation from a water slurry.

One optional component which may be used to form the desired protein product of this invention is a fat. Particularly suitable fat for use in this invention includes an oil or a hydrogenated fat. A typical oil which is suitable for use in this invention is corn oil. Corn oil is a commercially available product generally yellow in color and liquid. Other materials suitable for use are the hydrogenated fat series. Typical examples of the materials suitable for use in this invention include hard fats or other vegetable oils. Other specific fats suitable for use in this invention include palm oil, cottonseed oil, soybean oil, and other vegetable oils, animal fats such as tallow, lard, etc., or mixtures of these oils and fats.

As above stated, the fat is an optional component of this invention. The fat used in this invention may comprise one or more of the materials suitable for food use as a fat. Typically, the product of this invention contains from 0 to about 20% fat by weight of the components on a dry basis. About 10% to 12% is the most suitable amount of fat for film forming for a pastry type product because the fat improves the textural qualities of the pastry. The fat also changes and improves the mouth feel. The fat in the pastry also imparts a very desirable aroma to the product. The most suitable amount of fat for film forming for a meat-like product is approximately 8% to 12% because at higher lipid concentrations, there is apparently no benefit derived by the higher lipid content, whereas at lower lipid concentrations the plasticized film thus formed appears tender. The most suitable amount of fat for a chip-like product is 6% to 9% during film forming because of the matting properties of the film when passed through pressure rolls to obtain the desired textural qualities in the finished product.

The main purpose of the fat used in the product is to promote a stronger texture. It is possible to promote texture in the product with a salt bath. However, the salt bath would create a disposal problem. Thus, the preferred method of creating texture in the product is using the fat. The fat provides the texture without creating an effluent problem.

A further optional component of the protein product is a salt or a mixture of salts. These salts are generically edible salts. Specifically, edible phosphate salts add to the product the desired phosphate content needed for good nutrition. Edible calcium salts add to the product the desired calcium content for the necessary bone growth, calcium replacement in bones and teeth, etc. The use of the salts in the product also avoids a chalky mouth feel in the product and possibly provides some cross-linking stabilization between the protein molecules. To incorporate phosphate material in the protein, sodium phosphate salts are preferred. Typical sodium phosphate salts include sodium metaphosphate, sodium polyphosphate, and sodium dihydrogenphosphate having the formula $NaH_2PO_4 \cdot H_2O$. With the phosphate salts, about 0% to about 5% by weight of the dry ingredients is suitable for use. The best results come from using about 2½% to about 3% phosphate salt. The best result is achieved because the final phosphorus content in the product adheres very closely to the recommended dietary allowance in relation to the levels of proteins and other nutrients in the product.

With regard to the calcium salt, especially suitable edible calcium salts are calcium chloride, calcium carbonate, and calcium hydroxide. Calcium hydroxide is especially suitable as the calcium salt for this product because the salt provides only calcium into the product, thus preventing addition of acidic ions as chloride, etc. The amount of calcium salt suitable for use in this invention is about 0-5% by weight. A more suitable amount of calcium salt is 0.5% to about 1.0% calcium salt. Especially suitable for use in this invention is 0.7% calcium salt. This amount of calcium salt is suitable because it is in balance with the other nutrients when considered in relation to the protein and vitamin levels in the finished product.

Other suitable materials which can be included in the composition of this invention to bring the dry components up to 100% include rice flour, corn flour, oat flour, or potato flakes, or any other commercially available cereal flours or starches.

These additives provide the following benefits to the product. 1) They provide the energy balance needed in the product by providing an easily assimilable food source. 2) They help complete the bulk of the product. 3) They provide the delicate flavor characteristics of the cereal source used to the product. 4) The combination of the cereal protein in the flour with soy protein would provide synergistic nutritional advantages.

Especially suitable additives are oat flour, corn flour, potato flakes and rice flour.

The process for forming the products of this invention involves blending the protein source with other additives if desired. Then, the mix formed by blending the protein source with the other additives is mixed with water to form a slurry. Forming the mix of the protein source and the other desired materials is done in any suitable dry blending fashion. The methods of forming the mix are well known in the art. The forming of the slurry is accomplished by adding water to the dry mix. This process has the best features for forming a slurry because one obtains a uniform distribution of all the ingredients present in the slurry. However, other methods of forming a slurry are also suitable.

The slurry thus formed is shaped on a drum suitable for use in forming films. Many such drum apparatus are known in the art. For example, there are U.S. Pat. Nos. 3,414,982 to Oas; 3,509,815 to Lloyd; and 3,785,425 to Hyldon. These references all disclose heated drums for forming films, which are the product of this invention. Additionally, some of the patents show suitable doctor blades for removing the films from the drums. In this manner the protein film of this invention is formed.

A convenient way to measure the amount of water to form a slurry is to base the water on the weight of the dry solids. As above-mentioned, the dry solids comprise the protein and the optional ingredients of at least one fat or at least one salt. The amount of water used to form the slurry is up to 20 times the weight of the dry ingredients. Even more water than this can be used to form the slurry. It is desired, however, to use about 2 to about 6 times the weight of water compared to the weight of the dry ingredients. Above about 6 times the weight of water or more, a gelling step is required to form a suitable slurry. Gelling is accomplished by heating the slurry to gel as described at another point of the specification. The relative amount of water of about 2 to about 6 times the weight of dry solids is the most efficient for the formation of the slurry because it simplifies further processing and has other desirable advantages such as less water has to be evaporated which is an economic advantage. Lower ratios of solids to water also result in economics in bulk handling. However, it is important that the slurry have low enough viscosity to form a thin film on the surface of the drum to obtain a desirable product. As is seen, the weight of water is far in excess of the weight of dry ingredients. In this manner, the problem of effluence is avoided by the film forming process.

After the slurry is formed, an optional heating step may be provided. While this heating step is not essential to the course of the invention, it does help to provide a texture to the desired product. The heating step is usually applied to the slurry for about 10-45 minutes at a temperature of about 160-180° F. until the slurry gels. A preferred temperature for gelling the slurry is 170° F. This treatment of the slurry provides a certain texture which is desirable at times in the product of this invention, and is especially suitable when water content of the slurry is above about 6 times the weight of the dry components.

Whether the texture is provided by the gelling or the gelling step is not carried out, the slurry is next shaped into a film. Any thin film forming apparatus can be used to form a protein film from the slurry of this invention. A typical apparatus is a drum (single or double) drier with at least one or more applicators to apply at least one or more thin films or the protein slurry onto the surface of the evaporator. The drum is generally heated and provides the necessary heat for forming in this process. If a dual drum is used to form the films, either one or both drums may be heated. It is however, preferred to heat one drum only in a dual system in order to provide easy removal of the film from the drum. Heating is required to flash part of the moisture and undesirable odors off or out of the slurry.

The suitable temperature range at the drum surface for carrying out the heating to form the film of this invention covers from about 215° F. to about 285° F. At about 268° F. drum temperature the film seems to have the best quality for forming the products and other materials desired. Thus, the 268° F. drum temperature is the preferred temperature. At this drum temperature the film has a suitable flexxibility for both laminating and rolling. Also at the drum temperature of 268° F. the flashing is maximized without detriment to the protein product. Thus, the 268° F. is the suitable drum temperature because both the speed of processing and the pliability of the film is maximized because of the residual moisture in the film.

Any suitable means can be used to heat the drum. For example, the drum could be heated electronically, however, steam pressure is a most effective way of heating the drum. The steam pressure is simple to handle, and provides a direct means of heating. About 5 pounds of steam pressure at the guage to about 40 pounds of steam pressure or preferably 20 to 30 pounds at the guage is suitable for heating the drum. At about 25 pounds pressure per square inch per gram the desired temperature of 268° F. is achieved.

After the film has thus been formed, it can be either rolled or laminated to form the product. The rolling and the lamination is accomplished in a standard fashion. In order to assist the further processing of the films coming off the drums, it is required to leave from about 8–50% by weight of solids moisture in the film to assist further processing of the film as defined herein. Preferably, about 20–30% by weight of solids in the film coming off the drum is moisture. The best results are obtained when the film coming off the drum contains about 25% moistture. As is pointed out above, up to about 20 times the weight of water relative to the amount of solids is present in the original slurry. The heated drum flashes the moisture off and reduces it to level to obtain the desired handling characteristics in the film.

As above referenced, the protein film of this invention is shapeable into at least three basic categories of food products. Within each category, the film, coming off of the film-forming apparatus must contain the above-references about 8% to about 50% moisture. A preferred moisture range for a film for use to form a snack-like product is 15% to 25%. For the pastry-like product, the preferred moisture content of the film is 10% to 30%. For the meat-like product the preferred moisture content is 15% to 50%. Films containing moisture within the cited ranges can be used most efficiently to form the specific desired product.

Thus, it may be seen that the combination of the blending techniques, the film-forming technique, and the manipulation of the film thus formed provides a new and improved process and product resulting from the process. A modified protein is provided. This protein can be shaped into a pastry, a chip, or a meat. The filmforming process produces a bland tasting protein film that can be shaped into desirable forms and flavored. The bland protein thus formed permits the expansion of the usable protein available. The process removes the undesirable flavors present in the unprocessed protein. The resultant product is a bland protein which can be flavored to suit any desired taste. In this manner, protein not otherwise fit for human consumption is made edible.

If it is desired to form a snack-like chip, a plurality of films is laminated and fat fried. If a pastry is desired, more films than for the chip are laminated. Then the product is baked. If a meat-like product is desired, the film is rolled up to a desired diameter. It is also possible to use either rolls or laminates for any product if treated properly and then sliced. The film is usually up to about 0.01 inch thick (about 0.25 millimeter) although up to 0.003 inch (about 0.076 millimeter) thickness provides the more desired film-like structure and the film remains more suitable for use in forming the desired product. By "meat-like product" is meant a product which resembles flesh of cattle, swine, sheep, goats, horses, whales and other such mammals, poultry including but not limited to chicken, and fish.

The following examples which are intended to illustrate without unduly limiting the invention list components in parts or percentages by weight unless otherwise specified.

EXAMPLE 1

The following ingredients are used in this experiment:

| Ingredient | % by weight |
| --- | --- |
| soy protein isolate (NSI 91) | 83.5 |
| Mazola (corn oil) | 12.5 |
| Calcium hydroxide | 1.0 |
| Sodium orthophosphate . $H_2O$ | 2.0 |
| Sodium chloride | 1.0 |
| Water added | 5.95 times the dry mix |

The soy protein isolate, corn oil and part of the water needed are put in a mixer and blended. Sodium chloride and sodium orthophosphates are dispersed in part of the water and added to the protein mix and mixed. Calcium hydroxide is also dispersed in the rest of the water and is added to the mixer and mixed for 20 minutes. The mix temperature is then raised to form a gel by heating it for another 20 minutes. The gel formed at this stage contains approximately 14.5% solids and 85.5% moisture.

The protein gel formed is fed into the nip of a commercial Buffalo Vac 6 inch double drum drier. One of the drums of the double drum drier is heated with steam at 20-lbs. per square inch pressure at the guage whereas the other drum is at ambient temperature. The protein film thus formed is removed off the drum by a doctor blade and is allowed to roll over itself. Cigar-type rolls of films with varying diameters are thus obtained. The moisture level of the cigar shaped product thus obtained is approximately 35%. The diameter of the cigar-shaped roll varies between approximately 1 inch to 1½ inch, preferably the latter. The roll when diced into desired size has the fibrous texture and appearance of cooked meat.

The dried pieces of rolled protein films are sprayed with approximately 20% by weight of any desired edible fat or oil, Mazola oil in this example. The oil is allowed to be absorbed into the diced film roll. The pieces are then heated at approximately 230° F. in an atmosphere of steam to case harden the pieces so that the surface is less permeable to moisture and the product develops thermoprocess stability.

EXAMPLE 2

Example 1 is repeated except for the following changes in components.

| Ingredient | % by weight |
| --- | --- |
| cottonseed flour | 90 |
| corn oil | 7 |
| $NaH_2PO_4 . H_2O$ | 2.5 |
| $Ca(OH)_2$ | 0.5 |
| water | approx. 320 ml./100 g dry mix |

The plasticized protein film roll has meat-like texture, but has a cooked, dark color.

EXAMPLE 3

The following mix composition and processing conditions are used in this example.

| Ingredient | % by weight |
| --- | --- |
| soy flour (51% protein) | 77 |
| hydrogenated vegetable fat | 20 |
| sodium dihydrogen phosphate | 2.5 |
| calcium hydroxide | 0.5 |
| water | 3 to 5 times weight of dry mix |

The dry ingredients and the hydrogenated vegetable fat are mixed in a blender and the specified amount of water is added and mixed well for 20 minutes. The mix is applied at the nip of a commercial 6-inch Buffalo vac double drum drier where one of the drums is heated by steam at 20-lbs. per square inch pressure at the guage. The other drum is at ambient temperature. The rotation speed of the drums is 17–19 revolutions per minute.

The film formed on the heated drum is allowed to roll on itself at the doctor blade. The cigar shaped roll thus formed is cut into pieces of approximately 2 inches long by ½ the diameter of the rolls. The resulting product is a meat-like product similar to chicken.

EXAMPLE 4

The following formulation is used to produce a high protein chip-like product.

| Ingredient | % by weight |
| --- | --- |
| soy protein isolate | 29.6 |
| defatted soya flour | 29.6 |
| rice flour | 20.0 |
| corn oil | 9.6 |
| starch | 8.0 |
| sodium orthophosphate | 2.0 |
| sodium chloride | 0.8 |
| calcium hydroxide | 0.6 |

The dry ingredients are mixed in a Groen mixer with approximately 2 to 6 times its weight of water. The roll of film is obtained as in Example 1. The roll is sliced at a right angle to its length, approximately 1/10 inch thick.

The thin slices thus obtained are passed between pressure rolls and deep fat fried in a frying pan at 350° F. The resulting product has a texture very similar to potato chips and a very pleasing flavor.

EXAMPLE 5

The following ingredients are used in the present example.

| Ingredient | % by weight |
| --- | --- |
| soy protein isolate | 37 |
| soy flour | 37 |
| corn flour | 10 |
| corn oil | 12 |
| sodium orthophosphate | 2.5 |
| calcium hydroxide | 0.5 |
| sodium chloride | 1.0 |
| solids to water ratio | 1:2.75 |

The dry ingredients are mixed as in Example 5, and the protein film is collected in 5 to 8 layers thick. The layered protein film is passed through a double drum drier with 20-lbs. per square inch steam pressure at the guage on one drum. The pressed films are then sprayed with any desired edible oil or fat. The films are then cut into shape and baked in an oven. The resulting product had a very good texture and appealing flavor similar to corn chips.

EXAMPLE 6

The following formulation is used to make a high protein pastry using the present technology.

| Ingredient | % by weight |
| --- | --- |
| soy protein isolate | 30 |
| soy flour | 30 |
| sugar | 20 |

-continued

| Ingredient | % by weight |
| --- | --- |
| starch | 7 |
| shortening | 10 |
| sodium orthophosphate | 2.5 |
| calcium hydroxide | 0.5 |

Mix one part of the above mix with 2.4 parts of water in a Groen Kettle. Add the desired flavors and vitamins.

The mix is applied to a conventional double drum drier wherein one of the drums is heated by steam at 30-lbs. pressure per square inch at the guage. The other drum is at ambient temperature. The film thus formed on the heated drum is laminated to desired thickness, sixty layers in the present example. The moisture content of the film is adjusted to approximately 25% by manipulating the residence time of the film on the drum.

Shortening is sprayed in between the films at an interval of 10 films. The ratio of the fat to the film is 20:100. The layered films are then cut to desired sizes. The edges are heat sealed. This product is baked in a conventional oven at 350° F. until the pastry turns to golden brown color. The product puffs up very similar to layered pastry product. The texture and mouth-feel are very similar to a puffed pastry. The resultant product is completely free of all the undesirable odors and mouth feel of inexpensive ingredients used in making the product.

EXAMPLE 7

The following ingredients are used in this example.

| Ingredient | % by weight |
| --- | --- |
| defatted soy flour | 75 |
| powdered sugar | 15.25 |
| shortening | 5.0 |
| sodium orthophosphate | 3.0 |
| calcium hydroxide | 0.75 |

The product is made as explained in Example 6. A similar product as in the previous example is obtained but the protein content is reduced approximately by half in the present example.

Having thus thoroughly described and disclosed the invention, what is claimed and sought to be secured by Letters Patent is:

1. A process for preparing a versatile protein product comprising:
   (a) providing a mix of about 30% to about 95% of at least one protein source, 0 to about 20% of at least one edible fat, and 0 to about 5% of at least one edible salt;
   (b) adding water to the mix to form a slurry;
   (c) heating the slurry for about 10–45 minutes at a temperature of about 160–180° F. to gel the slurry;
   (d) forming the gelled slurry into at least one film comprising from about 8-50% by weight of moisture;
   (e) forming a product from the film; and
   (f) recovering the product.
2. The process of claim 1 wherein the protein source is at least one selected from the group consisting of soy protein, cottonseed protein, peanut protein, cereal protein, meat by-products and sodium caseinate.
3. The process of claim 2 wherein the protein source comprises 40% to 90% by weight of the mix.

4. The process of claim 3 wherein the salt comprises 0% to 5% sodium dihydrogenphosphate by weight of the mix and 0% to 5% calcium by weight of the mix.

5. The process of claim 4 wherein the film is heat set prior to forming a product from the film.

6. The process of claim 5 wherein the heating of the slurry is at 170° F.

7. The process of claim 6 wherein the gel is formed into the film on a heated rotating drum.

8. The process of claim 7 wherein the product is diced, is mixed with up to about twice its weight of water, and is retorted to simulate meat.

9. The process of claim 5 wherein the protein source is soy protein isolate.

10. The process of claim 5 wherein the protein source is soy flour.

11. The process of claim 5 wherein the fat source is corn oil.

12. The process of claim 11 wherein the corn oil is present at about 7.5% by weight of the mix.

13. The process of claim 5 wherein the fat source is oil or hydrogenated fat.

14. The process of claim 5 wherein the film is formed on a drum heated to about 268° F.

15. The process of claim 6 wherein the recovering of the product is accomplished by
  a) applying up to 20% oil to the product; and
  b) heat setting the product.

16. The process of claim 1 wherein the water content of the slurry is up to 20 times the weight of the dry ingredients.

17. The process of claim 16 wherein the forming of the product is accomplished by forming a laminate of the film wherein the film has a moisture content 10% to 30% by weight of the film.

18. The process of claim 19 wherein the laminate is baked to form a pastry.

19. The process of claim 1 wherein the protein is at least one selected from the group consisting of soy flour, soy protein concentrate, soy protein isolate, wheat gluten, oat protein, and corn protein.

20. The process of claim 1 wherein the moisture content of the film is about 15% to about 25% and a plurality of the films is laminated and fat fried to form a snack-like product.

21. The process of claim 20 wherein the slurry contains water in an amount at least 6 times the weight of the mix.

22. The process of claim 1 wherein a plurality of films is laminated and baked to form a pastry.

23. The process of claim 1 wherein the film has a moisture content of 15% to 50%, the film is rolled to form a roll, and the roll is cut to form a meat-like product upon heating.

24. The process of claim 23 wherein the slurry contains at least 6 times by weight of water based on the weight of the mix.

25. A process for preparing versatile protein product comprising:
  (a) providing a mix of about 30% to about 95% of at least one protein source, 0 to about 20% of at least one edible fat, and 0 to about 5% of at least one edible salt;
  (b) adding water to the mix to form a slurry;
  (c) heating the slurry for a time and at a temperature sufficient to gel the slurry;
  (d) forming the gelled slurry into at least one film comprising from about 8-50% by weight of moisture;
  (e) forming a product from the film; and
  (f) recovering the product.

* * * * *

UNITED STATES PATENT OFFICE
CERTIFICATE OF CORRECTION

PATENT NO. : 4,133,901
DATED : January 9, 1979
INVENTOR(S) : Richard W. Fetzer and Kolar S. Ramachandran It is certified that error appears in the above-identified patent and that said Letters Patent are hereby corrected as shown below:

In Column 6, Line 39, "or" should read --of--.

In Claim 18, "19" should read --17--.

Signed and Sealed this

Eighth Day of May 1979

[SEAL]

Attest:

RUTH C. MASON
Attesting Officer

DONALD W. BANNER
Commissioner of Patents and Trademarks